(12) United States Patent
Degen et al.

(10) Patent No.: US 7,503,160 B2
(45) Date of Patent: Mar. 17, 2009

(54) METHOD AND DEVICE FOR DETERMINING THE COMPRESSION PROPERTIES OF CROP MATERIAL

(75) Inventors: Peter Degen, Sassenberg (DE); Andreas Haffert, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 188 days.

(21) Appl. No.: 11/676,397

(22) Filed: Feb. 19, 2007

(65) Prior Publication Data

US 2007/0213106 A1     Sep. 13, 2007

(30) Foreign Application Priority Data

Feb. 28, 2006   (DE) ................. 10 2006 009 575

(51) Int. Cl.
*G01N 3/08*     (2006.01)
*A01D 41/127*   (2006.01)

(52) U.S. Cl. ................. 56/10.2 R; 460/1; 73/824

(58) Field of Classification Search ................. 460/1–7; 73/824; 56/10.2 R See application file for complete search history.

(56) References Cited

U.S. PATENT DOCUMENTS

| 6,257,072 | B1 | 7/2001 | Diekhans |
| 6,926,603 | B2 | 8/2005 | Kormann et al. |
| 7,077,743 | B2 | 7/2006 | Quincke et al. |

FOREIGN PATENT DOCUMENTS

| DE | 102 30 475 | 1/2004 |
| DE | 103 06 725 | 9/2004 |
| EP | 0 931 446  | 7/1999 |

*Primary Examiner*—Harshad Patel
*Assistant Examiner*—Jonathan Dunlap
(74) *Attorney, Agent, or Firm*—Michael J. Striker

(57) ABSTRACT

In method and a device for determining the compression properties of crop material in an agricultural working machine, a compressing device is capable of being filled with a material sample during the working process, the compression of the material sample is determined based on at least one defined precompression of the material sample carried out by the compressing device, and at least one compressing element assigned to the compressing device applies a load on the material sample and moves relative to it, to provide an improved compression effect in crop material.

15 Claims, 2 Drawing Sheets

METHOD AND DEVICE FOR DETERMINING THE COMPRESSION PROPERTIES OF CROP MATERIAL

CROSS-REFERENCE TO A RELATED APPLICATION

The invention described and claimed hereinbelow is also described in German Patent Application DE 10 2006 009 575.8 filed on Feb. 28, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for determining the compression of crop material.

Publication EP 0931 446 A1 makes known a measuring device for determining crop material- and/or conveyor-specific parameters in an agricultural working machine. The measuring device is located directly on the discharge blower of a forage harvester. The measuring device engages directly in the crop material flow and, based on its direct contact with the conveyed crop material, it measures a parameter of the crop material, e.g., the moisture content. The disadvantage of this embodiment, however, is that the parameter measurement is highly dependent on the crop material throughput. In addition, it does not allow conclusions to be drawn about the compression property and, therefore, the level of compression force that must be applied to compress the crop material in an optimal manner.

Publication DE 102 30 475 A1 discloses a sample extraction device with which crop material is removed from the flow of crop material. The samples obtained in this manner—which are independent of the throughput—can be used to develop calibrations of NIR measurement systems. Information about quality-related parameters of the crop material, such as moisture content, can also be obtained in this manner. The problem of determining the compression property of the crop material is not solved by the embodiment disclosed in DE 102 30 475 A1.

The compression properties of crop material not only decisively influence the on-line sensing of crop material throughputs, they are also very significant in terms of optimizing crop material compressing processes, as is required, e.g., for storing crop material in silos. The stability of a silage therefore depends to a significant extent on the compression of the crop material to be ensilaged. If, during ensilage, the newly cut crop material is not compressed permanently and thoroughly, residual oxygen becomes enclosed in the individual layers of crop material, which can ultimately result in the growth of undesired organisms such as yeast and fungi, and to improper fermentation, which, in turn, results in a considerable reduction in the nutritional content of the silage. The compression force to be applied depends on the compressibility of the harvested crop material, which depends, in particular, on parameters such as moisture content or the length of cut of the crop material.

SUMMARY OF THE INVENTION

The object of the present invention, therefore, is to eliminate the disadvantages of the related art cited above and, in particular, to provide a method and a device that operate according to this method, thereby making it possible to reliably and accurately determine the compression property of harvested crop material during the harvesting operation.

In keeping with these objects and with others which will become apparent hereinafter, one feature of the present invention resides, briefly stated, in a method for determining a compression property of harvested crop material in an agricultural working machine, comprising the steps of filling a compressing device with a material sample during a working process; determining a compression of the material sample depending at least one defined compression of the material sample carried out by the compression device; assigning at least one compressing element to the compressing device; and applying a load on the material sample by at least one compressing device and moving the at least one compressing element relative to the material sample.

Another feature of the present invention resides, briefly stated, in a device for determining a compression property of harvested crop material in an agricultural working machine with at least one compressing device fillable with a material sample during a working process, the device comprising at least one sensor provided to determine a defined precompression of the material sample located in the compressing device; and at least one compressing element assigned to the compressing device and operative for applying a load on the material sample and moving relative to it.

Given that the compression of the material sample is determined based on at least one compression of the material sample carried out by the compressing device—during which at least one compressing element assigned to the compressing device applies a load on the material sample and moves relative to it—it is possible to improve the determination of the compression property of crop material as compared with the related art. Given, in particular, that the material sample is compressed via the load and the rotational motion applied by the compressing element, pockets that form in bulky crop material—which can result in undesired measurement fluctuations—can be closed nearly completely, and a more exact measure of the compression can be attained.

In a first embodiment of the present invention, the at least one compressing element applies a load on the material sample and simultaneously moves relative thereto. Advantageously, the load application is realized in the form of force components, and the relative motion is realized as rotational motion. As a result, shear forces—in addition to the vertical force—act on the material sample simultaneously and serve to close pockets, thereby making it possible to compress the material sample in an optimal manner.

Given that the load application and the relative motion of the at least one compressing element are adjustable according to the type and/or property of the crop material, the compression force introduced by the compressing element into the material sample can be adapted to different types and structures of crop material.

In an advantageous embodiment of the present invention, a measure of the compression property of the crop material is derived from the identified compression of the material sample. This has the particular advantage that a parameter is now available that can be used to perform a qualitative evaluation of the compressibility of the crop material. In the simplest case, the compression property of the crop material is determined by identifying the rebound behavior of a material sample.

In an advantageous embodiment of the present invention, a very precise determination of the crop material throughputs or yields results when a yield measuring device is provided in the agricultural working machine, and the crop material throughput and/or yield measured by the yield measuring device are determined with consideration for the identified compression and rebound behavior of the material sample. An embodiment of this type has the particular advantage that the density values of a material sample—which are required in order to determine mass—are more precise, thereby resulting in a more accurate overall result of a throughput measurement.

In an advantageous embodiment of the present invention, the identified rebound behavior of the crop material is available for further applications. A particularly advantageous refinement results when the further application is the operation of an agricultural working machine with a compressing device in a horizontal silo, and the operator of the agricultural working machine is notified—before delivery of the crop material to be ensilaged—about the identified rebound behavior at the least, and the operator can adjust the action of the compressing device based on this information.

In a further embodiment of the present invention, the agricultural working machine is a forage harvester with at least one intake roller and a deflectably supported compression roller for compressing the crop material that is conveyed between the at least one intake and compression roller. The crop material throughput is determined by the agricultural working machine via the deflection of the at least one compression roller. During the process of compressing the material sample in the compressing device, the compression force, the volume associated therewith, and the measure of the rebound behavior of the material sample are determined. At least one relationship between the compression force, the rebound behavior, and the volume is determined, and the at least one relationship is taken into account in the determination of the crop material throughput.

An advantageous embodiment of the present invention results, in particular, when at least one sensor is provided for measuring a defined precompression of the material sample located in the compressing device, at least one compressing element is assigned to the compressing device, and the compressing element applies a load on the material sample and moves relative to it.

In a particularly advantageous embodiment of the present invention, the material sample is removed directly from the flow of crop material in the agricultural working machine and directed into the compressing device through an opening. Intermediate conveying devices—which are susceptible to disruption—can therefore be eliminated entirely, thereby ensuring that the device is always available during the working operation.

Advantageously, the agricultural working machine is a forage harvester with a chopper drum and a material-redirecting drum disc that surrounds at least part of the chopper drum, and the opening is located in the material-redirecting drum disc. The crop material is conveyed continually via the knives that rotate inside a chopper drum of a forage harvester. The location of the opening in the material-redirecting drum disc enables the crop material to be removed reliably from the chopper drum. The fact that crop material is not redirected in the region near the open opening while the material sample is being extracted serves to convey the material sample into the compressing device. The active conveyance of crop material in the chopper drum advantageously serves to continually convey additional crop material toward the opening, and it serves to keep the removal site clear. The advantageous location of the opening prevents permanent disruptions of the material flow from occurring, and it prevents material from building up as a result of sample extraction. These advantages also result when the agricultural working machine is a combine harvester with a straw chopper and an attached, material-redirecting guide floor, and the opening is located in the material-redirecting guide floor.

In a further embodiment of the present invention, the material sample extracted from the compressing device is returned to the flow of crop material in the agricultural working machine using at least one rotationally movable compressing element. As a result, the material sample is not wasted, and the field where the work has been performed is left clean.

Given that, in an advantageous embodiment of the present invention, a control and evaluation unit is assigned to the further agricultural working machine, the control and evaluation unit receives a rebound signal that is proportional to the rebound of the crop material to be compressed, and means are provided that make it possible to change the loads to be placed by the compressing device on the crop material to be compressed, it is ensured that the compressing effect of the compressing device is adaptable to the rebound behavior of the crop material to be compressed.

In an advantageous refinement of the present invention, the loads to be placed on the crop material to be compressed are compression forces and the rotating or oscillating motion of the compressing element(s), so that, simply by changing the rotational speed of the compressing elements and regulating the contact pressure, it is ensured that the loads can be adapted to the particular crop material properties in a rapid, flexible manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
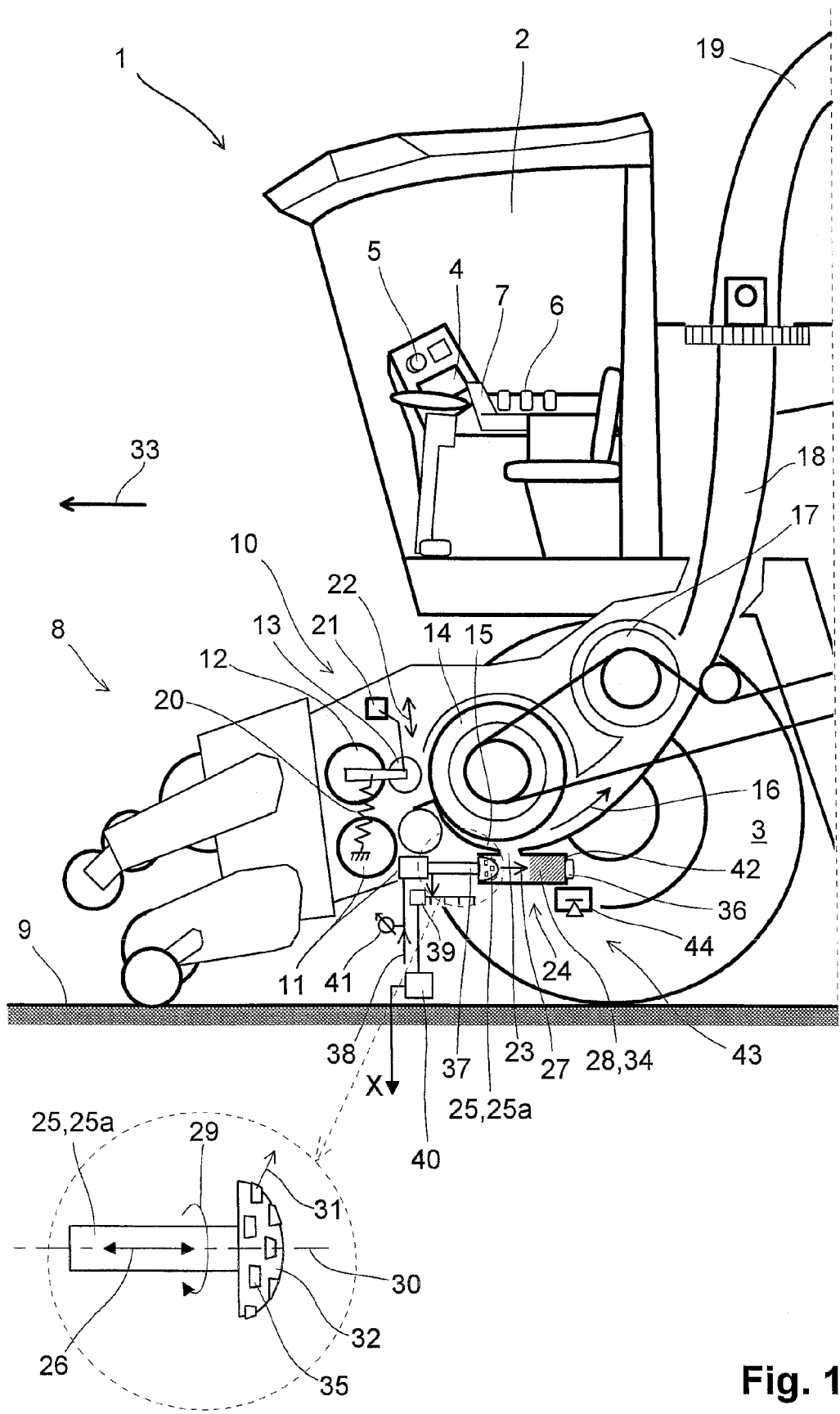
FIG. 1 shows a section of the front side of a forage harvester with the inventive compressing device, in a side view.

FIG. 1 shows a front—relative to direction of travel 33—part of an agricultural working machine designed as a forage harvester 1 with a driver's cab 2 and a drive wheel 3. Depicted in driver's cab 2 is a display device 4 and at least one adjusting device 5, and further operating elements used to operate forage harvester 1, such as switch 6 and ground speed control lever 7. Forage harvester 1 shown is equipped with a front attachment 8, with which forage harvester 1 picks up not-shown crop material from ground 9 and transfers it to downstream intake assembly 10, spread across its width. Two driven, lower intake rollers 11 and two driven, upper, movably supported compression rollers 12, 13 are located inside intake assembly 10. The crop material supplied to intake assembly 10 is compressed between intake rollers 11 and compression rollers 12, 13 by the force applied by at least one spring 20 onto compression rollers 12, 13, and the crop material is transferred to downstream chopper drum 14. Rotating chopper drum 14 chops the crop material and actively conveys it along drum disc 15 in conveyance direction 16 to post-accelerator 17. There, the crop material is accelerated again and transferred via discharge chute 18 and subsequent upper discharge chute 19 into a not-shown transport container.

Forage harvester 1 shown is equipped with a yield measuring device which is known to one skilled in the art. FIG. 1 only shows gap sensor 21, however. Gap sensor 21, which is known per se and is therefore not described in greater detail, is used to determine the gap between rear intake roller 11 and rear compression roller 13. Deflection 22 of rear compression roller 13 caused by the compressed crop material layer is evaluated by a not-shown evaluation device and is used—in combination with the width of intake assembly 10 and the crop material speed—to determine a crop material throughput volume. Based on the volume of crop material conveyed, and depending on the density of the crop material, a crop material throughput can be calculated in t/h.

Inventive compressing device 24—which operates according to the inventive method—is located on drum disc 15. It is within the scope of the present invention to locate compressing device 24 on a guide floor of a straw chopper in a combine harvester. This requires no further explanation, since it is obvious to one skilled in the art. It is also within the scope of the present invention for the filling of compressing device 24 to be triggered manually during the working process, or for this to take place automatically.

Inventive compressing device 24 includes a compressing element 25a that will be described in greater detail below, is designed as a compressing plunger 25, and is movably located in a sample chamber 34. Sample chamber 34 is oriented in direction of travel 33 of forage harvester 1, which nearly corresponds to the direction of the crop material flow along drum disc 15. Conveyance direction 16 of the crop material is opposite to direction of travel 33. Due to the design, compressing plunger 25 performs compression and moves inside sample chamber 34 in the same direction in which sample chamber 34 is oriented.

Drum disc 15 is designed to redirect material, and it includes an opening 23. Sample chamber 34 is filled with chopped crop material through opening 23 while forage harvester 1 operates. Opening 23 is opened by compressing plunger 25—in the position shown—so that a material sample can be extracted from chopper drum 14. Through opening 23, crop material that has been chopped by chopper drum 14 enters sample chamber 34 directly, due to the fact that it is not redirected when it is near opening 23, and due to the centrifugal force that acts on it, and the fact that it is actively conveyed by chopper drum 14.

Compressing plunger 25 can be moved into and out of sample chamber 34 in arrow direction 26. Compressing plunger 25 therefore applies a compressing force 27 on material sample 28 and compresses it in the longitudinal direction. Compressing plunger 25 can also perform a relative motion, as indicated by arrow direction 29. In the simplest case this is a rotating or oscillating motion around longitudinal axis 30, thereby simultaneously introducing transverse forces 31 into material sample 28, which also displace the fibers of material sample 28 in the transverse direction, thereby resulting in a more intensive compressing effect in material sample 28. A particularly intensive compressing effect is attained when a contact head 32—which is dome-shaped in the exemplary embodiment shown—is integrally formed on compressing plunger 25 on the material sample side, and contact head 32 includes several ribbed driving elements 35 that act on material sample 28.

In analogy to DE 103 06 725—to the disclosed contents of which reference is hereby explicitly made, and which is intended to be included in the disclosure of the present invention.—the opening is closed after a certain amount of time by the act of compressing plunger 25 moving in the direction toward sensor device 36, which is located on the opposite end of sample chamber 34, and via the design of compressing plunger 25 shown—. A separate, controlled sliding element located at opening 23, and an intermediate conveyance means for filling sample chamber 34 are within the scope of the present invention and are included herein. Opening 23 can also be located in the active conveyance region of post-accelerator 17.

Compressing plunger 25 is moved inside sample chamber 34 via a controlled reciprocating cylinder 37, which can induce the compressing plunger to perform a translatory motion and a rotational motion at the same time. An electro-hydraulic control device—which is not shown here but is known to one skilled in the art—prompts oil to be delivered to reciprocating cylinder 37 via schematically depicted line 38 in response to a command from a not-shown, higher-order sample control unit. As a result, reciprocating cylinder 37 moves compressing plunger 25 out of the rear end position shown. The position of compressing plunger 25 in sample chamber 34 is detected by a position sensor 39 and is queried by the sample control unit. The volume of the material sample can be determined based on the position of compressing plunger 25 in sample chamber 34 and with reference to the known dimensions of sample chamber 34 for every position of the compressing plunger.

As shown in FIG. 1, position sensor 39 extends across nearly the entire length of compressing device 24, thereby enabling it to simultaneously determine the position of compressing plunger 25 and the expansion of material sample 28 in the loaded and non-loaded states. Based on the expansion of material sample 28 in the loaded and non-loaded states, a rebound signal X that is proportional to the rebound of crop material sample 28 is generated in an arithmetic logic unit 40 assigned to position sensor 39. In a manner according to the present invention, rebound signal X also serves as a measure of the rebound behavior, which is representative of the compression property.

The compression of the material sample can be determined by at least one sensor that is known to one skilled in the art, e.g., a pressure, force, or density sensor. The sensor can be located in sample chamber 34, or it can be sensor device 36 itself. In FIG. 1, the pressure in line 38 is sensed by a pressure sensor 41 and reported to the sample control unit. Based on the pressure reading, compressing force 27 introduced in material sample 28 is determined, and it is representative of the defined precompression of material sample 28. Pressure sensor 41 can also be located on plunger 25 or reciprocating cylinder 37, or on line 38.

In addition, the sample control unit is connected with adjusting device 5, display device 4, and at least one switch 6 in driver's cab 2. The sample control unit can be used to activate sample extraction, specify a crop material type, or adjust the position of compressing plunger 25 for the subsequent stroke of compressing plunger 25, i.e., the clearing stroke, or the threshold values for the filling-compressions and the defined precompressions. According to the present invention, threshold values for different compressions can be selected using adjusting device 5 or they can be selected from a memory device, to thereby adapt compressing device 24 to the different crop materials and their compression properties. To prevent air pockets and attain a homogeneous material sample, bulky crop materials such as long or old grass and straw can be compressed with a force up to a larger defined compressing force 27. The current course of the process and the selected and measured parameters for sample extraction and material sample 28 can be displayed to the operator of forage harvester 1 on display device 4.

The sample control unit automatically controls the inventive process for measuring a crop material parameter. Based on the position of compressing plunger 25 indicated by position sensor 39, a filling of sample chamber 34 with crop material is detected. To this end, the sample control unit can first automatically move compressing plunger 25 into this position, after, e.g., sample extraction is manually activated via switch 6. According to the present invention, it is provided that compressing plunger 25 performs reciprocating motions 26 and rotating and oscillating motions 29 simultaneously in axial direction 30 during the filling procedure. As a result, the crop material already located in sample chamber 34 below opening 23 is pressed further and compressed in sample chamber 34, and opening 23 is cleared for the next batch of crop material. At the end of the filling procedure, reciprocating cylinder 37 is moved by the sample control unit to a predefined position, e.g., until opening 23 is closed by compressing plunger 25, and is then retracted to the end position shown. While the opening is being cleared, the sample control unit continues to monitor the filling-compression based on compression force 27 introduced into material sample 28 that is already there. When compression force 27 has reached a predefined threshold value, the filling procedure is ended. A material sample 28 that has been precompressed to an extent that is adequate for measuring the particular crop material parameter is now located in sample chamber 34.

It is within the scope of the present invention that, during the process of filling sample chamber 34, a lower threshold value (filling-compression) can be preselected for compression force 35 or the rotating and oscillating motion 29 of compressing plunger 25, and the defined precompression is brought about only when material sample 28 is compressed for the last time. According to the present invention, the sample control unit now triggers reciprocating cylinder 37 to compress material sample 28 further and move compressing plunger 25 into sample chamber 34 until the defined precompression is introduced into material sample 28, e.g., compression force 27 specified by a second threshold value in the sample control unit. After material sample 28 is compressed and sensed, it is either returned to the flow of crop material or discharged from forage harvester 1 in a manner that is known per se and is therefore not described further.

During the compressing process, the sample control unit can continuously determine—in a manner known per se—the position of compressing plunger 25 or the volume of material sample 28, compressing force 27 and the rebound behavior of material sample 28, and store this information as data pairs in a memory located in the sample control unit. Based on the measured values that were recorded, the relationship between the volume of material sample 28 and compression force 27 is determined, and a related characteristic is obtained. Since the volume of compressed material sample 28 in sample chamber 34 differs every time a sample is extracted, the recorded characteristics are normalized to a ratio or a predefined compression. This makes it possible to compare characteristics and read off correction factors.

The different properties, such as the moisture content or structure of crop material, the crop materials and the use of the harvesting machine in different crop material types result in different compression and, therefore, a different deflection 22 of compression roller 13. The identified crop material throughput—which is based on deflection 22 of compression roller 13—can be corrected accordingly, in a manner according to the present invention. The compressibility of the crop material being processed at that instant can be deduced from the relationship between the volume of material sample 28 and compression force 27.

In an advantageous embodiment of the present invention, compression force 27 and rotational motion 29 of compressing plunger 25 can be changed depending on the type and/or property of the crop material. This is significant in particular because it is generally known that the compressibility of a material worsens as the moisture content decreases. This effect can therefore be counteracted by compressing material sample 28 more intensively.

The moisture content of a crop material and—in the exemplary embodiment shown—in material sample 28 can be determined using the aforementioned sensor device 36 in a manner such that it is located on rear wall 42 of sample chamber 34 and includes an, e.g., capacitative moisture sensor that is known per se. The value measured by the moisture sensor is measured with reference to a known material volume. To attain a reliable result, it is therefore necessary that the moisture value—which is based on a different sample volume—be corrected accordingly. Based on the volume—which is determined according to the present invention—of material sample 28 located inside sample chamber 34, it is therefore possible to correct the moisture value measured by the moisture sensor.

In a manner known per se and described in greater detail in DE 103 06 725, compressing device 24, sensor device 36 assigned thereto, and position sensor 29 described are included in a yield measuring device 43. Yield measuring device 43 can determine—via integration of a weighing device 44 which is known per se and which determines the mass of material sample 28—a crop material yield of a crop material flow passing through forage harvester 1 by determining a material density and volume based on the various measured quantities. Given that one of the measured quantities is rebound behavior X of material sample 28, a qualitative improvement of the measured material density and the material volume to be measured is attained.

To improve the crop material yield that can be determined, it is now provided that yield measuring device 43 determines the crop material throughput and/or the crop material yield with consideration for the compression and rebound behavior X of material sample 28 that were identified. This has the particular advantage that different crop material properties can be better taken into consideration in the determination of crop material throughput. Given that generated rebound signal X—which qualifies the compressibility of the crop material—is now available for subsequent applications, subsequent material-working processes can be better matched to the particular material properties. In the simplest case, this availability can be ensured via data exchange using data transmission systems known per se.

Figure 2:
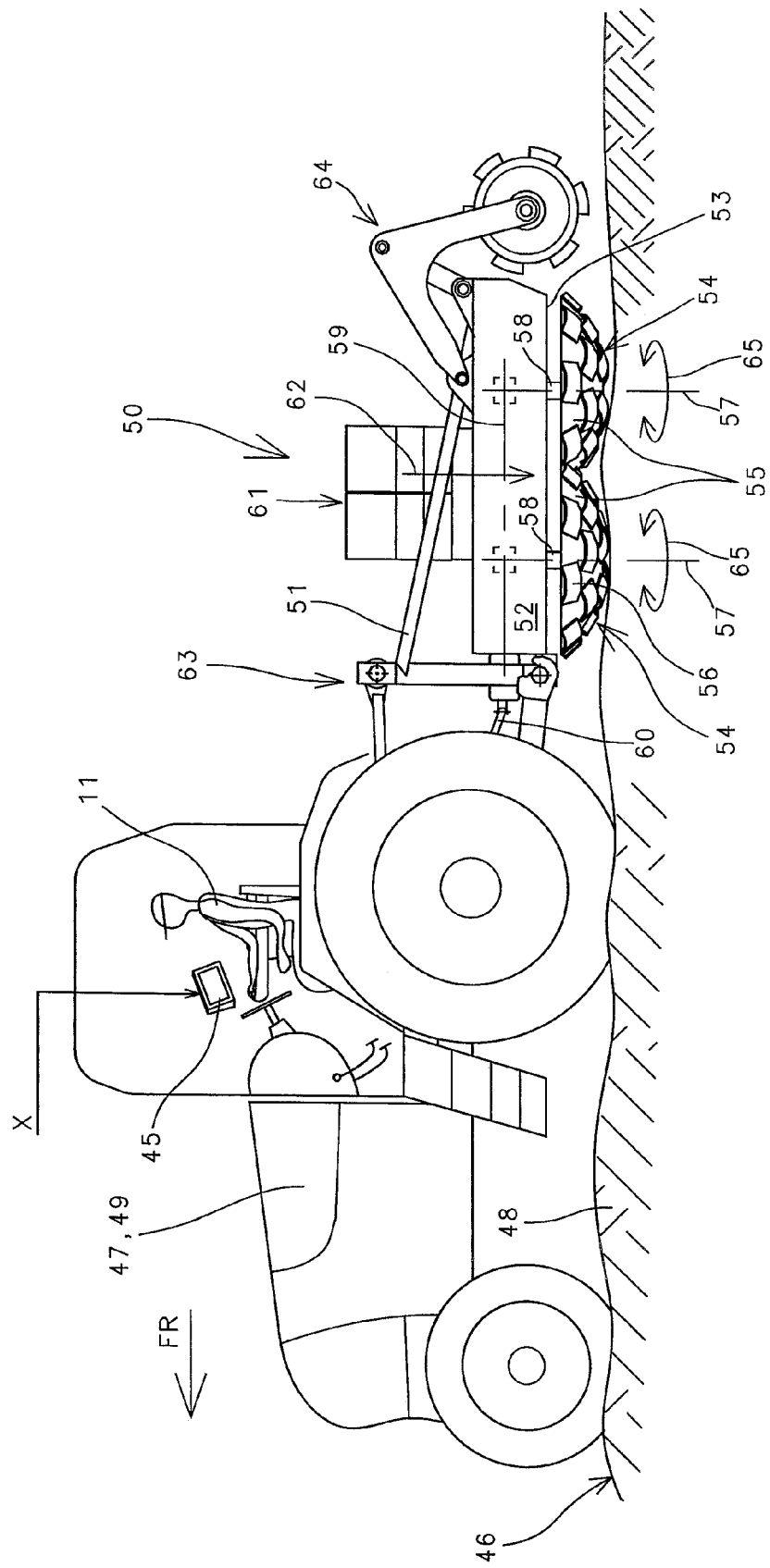
FIG. 2 shows a further agricultural working machine for compressing crop material in a silo.

Given that, according to FIG. 2, this rebound signal X is directed via a control and evaluation unit 45 to an agricultural working machine 47 that is filling a horizontal silo 46, agricultural working machine 47 can initiate a more or less intensive compression of crop material 48, depending on rebound behavior X of crop material 48 to be compressed; crop material 48 to be compressed was harvested and sensed previously using forage harvester 1 which is shown in FIG. 1 and is explained with reference thereto. In the exemplary embodiment shown, agricultural working machine 47 is a tractor 49 and a compressing device 50 assigned to the rear side thereof.

Compressing device 50 is composed essentially of a frame 51 made of steel tubing. Frame 16 is closed on the circumference by sheet metal panels 18 located at a right angle thereto. The entire bottom side of frame 51 is also closed, thereby forming a contact or sliding surface 53. Compressing elements 54 that are offset relative to each other are assigned to the underside of compressing device 50. Each compressing element 54 is composed of a domed main body 55, on outer surface of which ribbed driving elements 56 are provided. Compressing elements 54 are drivable in a rotating or oscillating manner around their vertical axes of rotation 57. To this end, every main body 55 of every compressing element 54 is non-rotatably connected with a shaft 58, and can be driven via a drive train 59—which is not described in greater detail—by P.T.O. shaft 60 of tractor 49. A ballast weight 61 can also be assigned to the top of frame 51 of compressing device 50 to increase the compression force 62 transferred by compressing device 50 onto crop material 48. Compressing device 50 can be brought into the working or transport position via three-point hydraulics 63 of tractor 49. At the same time, pressure can be applied to compressing device 50. It is also feasible to vary the tilting of compressing device 50 relative to laid-down crop material 48 using three-point hydraulics 63 of tractor 12, in order to prevent crop material 48 from building up in front of compressing device 50 and, therefore, to prevent compressing device 50 from being driven into laid-down crop material 48. A crop material spreading device 64 which is known per se can also be assigned to compressing device 50 on the side of compressing device 50 opposite to tractor 49.

In order to now attain optimal compression of crop material 48, transmitted rebound signal X is taken into account in a manner according to the present invention such that the effect of compression force 62 and rotating or oscillating motion 65 can be regulated. In the simplest case, compression force 62 and rotating or oscillating motion 65 can be that much greater or intense the greater the rebound behavior is of crop material 48 to be compressed.

To compress crop material 48, compressing device 50 rests on laid-down crop material 48 and, via ballast weight 61 and/or three-point hydraulics 63, exerts a vertical force 62 on crop material 48, while individual compressing elements 54—which are rotating around their vertical rotational axis 57 with assigned, ribbed driving elements 56—cause crop material 48 to be pushed together via the shear forces produced, thereby closing any undesired pockets in silo 46.

It will be understood that each of the elements described above, or two or more together, may also find a useful application in other types of methods and constructions differing from the type described above.

While the invention has been illustrated and described as embodied in a method and device for determining the compression properties of crop material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for determining a compression property of harvested crop material in an agricultural working machine, comprising the steps of filling a compressing device with a material sample during a working process; determining a compression of the material sample depending on at least one defined compression of the material sample carried out by the compression device; assigning at least one compressing element to the compressing device; and applying a load on the material sample by at least one compressing element and moving the at least one compressing element relative to the material sample, to simultaneously introduce transverse forces into a material of the material sample in a transverse direction.

2. A method as defined in claim 1; and further comprising realizing a load application on the material sample as force components; and realizing a relative motion between the at least one compressing element and the material sample as a rotational motion.

3. A method as defined in claim 1; and further comprising adjusting the load application and the relative motion of the at least one compressing element depending on a parameter selected from the group consisting of a type of the crop material, a property of the crop material, and both.

4. A method as defined in claim 1; and further comprising deriving a measure of a compression property of the crop material from the compression of the material sample that was determined.

5. A method as defined in claim 1; and further comprising determining the compression property as a rebound behavior of the material sample.

6. A method as defined in claim 5; and further comprising making available the identified rebound behavior of the crop material for further applications.

7. A method as defined in claim 6; and further comprising using as a further application an agricultural working machine with the compressing device in a horizontal silo; notifying an operator of the agricultural working machine—before delivery of the crop material to be ensilaged—about the identified rebound behavior; and adjusting by the operator an action of the compressing device based on this information.

8. A method as defined in claim 1; and further comprising providing a yield measuring device in the agricultural working machine; and determining a parameter selected from the group consisting of a crop material throughput, a yield measured by the yield measuring device, and both with consideration for the identified compression and a rebound behavior of an material sample.

9. A method as defined in claim 1, wherein the agricultural working machine is a forage harvester with at least one intake roller and at least one deflectably supported compression roller; and further comprising compressing the crop material between the at least one intake and compression roller; determining a crop material throughput by the agricultural working machine based on a deflection of the at least one compression roller; during the process of compressing the material sample in the compressing device, determining a compression force, a related volume, and a measure of rebound behavior of the material sample; determining at least one relationship between the compression force, the rebound behavior, and the volume; and taking into account the at least one relationship in the determination of the crop material throughput.

10. A device for determining a compression property of harvested crop material in an agricultural working machine with at least one compressing device fillable with a material sample during a working process, the device comprising at least one sensor provided to determine a defined precompression of the material sample located in the compressing device; and at least one compressing element assigned to the compressing device and operative for applying a load on the material sample and moving relative to the material sample, to simultaneously introduce transverse forces into a material of the material sample in a transverse direction.

11. A device as defined in claim 10; and further comprising means for removing the material sample directly from a flow of crop material in the agricultural working machine and directing it into the compressing device through an opening.

12. A device as defined in claim 10, wherein the agricultural working machine is a forage harvester with a chopper drum and a material-redirecting drum disk that surrounds at least part of the chopper drum, and the opening is located on the material-redirecting drum disk.

13. A device as defined in claim 10, wherein at least one compressing element is configured so that the material sample is returned from the compressing device to a flow of crop material in the agricultural working machine using the at least one compressing element.

14. A device as defined in claim 10; and further comprising a control and evaluation unit assigned to a further agricultural working machine and receiving a rebound signal that is proportional to a rebound of the crop material to be compressed; and means for making it possible to change loads to be placed by the compressing device on the crop material to be compressed.

15. A device as defined in claim 14, wherein said means for making possible to change the loads are configured so that the loads to be placed on the crop material to be compressed include compression forces and a motion of the compressing element selected from the group consisting of a rotating motion and an oscillating motion.

\* \* \* \* \*